(12) United States Patent
Xie

(10) Patent No.: US 8,880,041 B2
(45) Date of Patent: Nov. 4, 2014

(54) METHOD AND SYSTEM FOR EXCHANGING CALLING AND CALLED ROLES OF COMMUNICATION TERMINALS

(75) Inventor: Jun Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 2 days.

(21) Appl. No.: 13/576,441

(22) PCT Filed: Jun. 18, 2010

(86) PCT No.: PCT/CN2010/074104
§ 371 (c)(1),
(2), (4) Date: Aug. 1, 2012

(87) PCT Pub. No.: WO2011/106953
PCT Pub. Date: Sep. 9, 2011

(65) Prior Publication Data
US 2012/0322424 A1    Dec. 20, 2012

(30) Foreign Application Priority Data
Mar. 2, 2010    (CN) .......................... 2010 1 0122709

(51) Int. Cl.
*H04M 3/42*    (2006.01)
(52) U.S. Cl.
CPC ............................. *H04M 3/42195* (2013.01)
USPC ........ 455/414.1; 455/466; 455/460; 455/461; 705/3
(58) Field of Classification Search
CPC ............... H04M 2207/18; H04M 3/48; H04L 29/08108
USPC ................... 455/414.1, 460, 461, 466; 705/3
See application file for complete search history.

(56) References Cited

U.S. PATENT DOCUMENTS

| 6,574,324 B1 | 6/2003 | Malik |
| 6,775,365 B1 | 8/2004 | Norby |
| 2008/0080699 A1* | 4/2008 | Skubnik et al. .......... 379/356.01 |

FOREIGN PATENT DOCUMENTS

CN    101365016 A    2/2009

OTHER PUBLICATIONS

International Search Report dated Dec. 9, 2010 for PCT/CN2010/074104

* cited by examiner

*Primary Examiner* — Patrick Edouard
*Assistant Examiner* — Chuck Huynh
(74) *Attorney, Agent, or Firm* — Banner & Witcoff, Ltd.

(57) ABSTRACT

A method for exchanging calling and called roles of communication terminals is disclosed. The method includes: a virtual calling party initiating a service request, and sending service request information to a virtual called party; the virtual called party matching a characteristic field carried in received service request information with data in a self preset calling-called role exchange rule base, and if the characteristic field and data can be matched, initiating a corresponding callback service to the virtual calling party according to contents of matched items; and the virtual calling party receiving the corresponding callback service initiated by the virtual called party. A system for exchanging the calling and called roles of communication terminals is also disclosed. By the method and system of the invention, the exchange of calling and called roles between communication terminals of two parties can be implemented automatically, which improves user experience on communication terminal products.

6 Claims, 3 Drawing Sheets

METHOD AND SYSTEM FOR EXCHANGING CALLING AND CALLED ROLES OF COMMUNICATION TERMINALS

TECHNICAL FIELD

The present invention relates to communication terminal technology, and especially, to a method and system for exchanging calling and called roles of a communication terminal.

BACKGROUND OF THE RELATED ART

With the high development of the science and technology, the application of communication terminal equipment becomes increasingly popular, and especially in the field of mobile communication, mobile phones have gradually become one of the essential goods in people's lives. In the communication process, a concept of role playing exists between two or more parties of the communication, generally, a terminal initiating calls is known as a calling party and may be referred to as the caller for short, and a terminal receiving calls is known as a called party and may be referred to as the called for short. In practical communication process, it is usually required to perform an exchange of the calling and called roles, which is reflected in following aspects chiefly.

First, charges borne by the calling and called roles are different. Specifically, the caller needs to pay for the calling call charge, if the called is a fixed-line telephone, the charge is free, and if the called is a mobile phone, the answer fee is required to be paid. Generally, the amount of the answer fee is less than the amount of the calling call charge, and if a user participates in certain services, calls can be answered free of charge. Therefore, during the same conversation, if more called roles are acted, the amount of payment can be reduced.

Second, the user experience is satisfied. For example, parents buy a mobile phone for their children but do not expect the children to abuse the mobile phone, at the point, the parents can charge the mobile phone for the children according to the scheduled call charge limit, and the parents play the calling role in calls between the parents and children. Therefore, the call charge limit of the children can be controlled, and also call charge expenses generated from the children calling the parent party can be reduced, thereby enhancing the user experience of mobile terminal products.

Finally, the permission of the terminal initiating communications is different from the permission opened by an opposite terminal. For example, the two parties of communication need to perform data transmission, wherein, the memory of card of one party is 64 K, and the memory of card of the other party is 384 K. In order to make the party of which the memory is 64 K can initiate communications and use 384 K bandwidth, it needs to be implemented through a method for exchanging the calling and called roles at the point.

In the related art, the implementation of the exchange of the calling and called roles is mainly dependent on manual operations. One way comprises that, when a user A calls a user B, the user B hangs up after making a judgment according to information such as incoming call numbers and so on, and the user A returns to wait for a response due to rejection of the user B, and then the user B calls the user A to achieve the exchange call between the calling and the called. Another way is that the user A and user B appoint when the user B calls the user A in advance, and the user A waits for calls of the user B in blind, or the user A edits a short message to the user B and triggers the user B to call back and so on.

It can be seen from the above description that operations of the above two modes are both cumbersome and inconvenient.

SUMMARY OF THE INVENTION

In view of this, the main object of the present invention is to provide a method and system for exchanging calling and called roles of communication terminals, which can implement the exchange of the calling and called roles automatically.

In order to achieve the foregoing objects, the technical scheme of the present invention is implemented as follows.

The present invention provides a method for exchanging calling and called roles of communication terminals, which comprises:

a virtual calling party initiating a service request, and sending service request information to a virtual called party;

the virtual called party matching a characteristic field carried in the received service request information with data in a preset calling-called role exchange rule base of the virtual called party, and after determining that the characteristic field and the data can be matched successfully, initiating a corresponding callback service to the virtual calling party according to contents of matched items; and the virtual calling party receiving the corresponding callback service initiated by the virtual called party.

In the above scheme, after determining that the characteristic field and data can be matched successfully, the method further comprises:

the virtual called party not initiating the callback service to the virtual calling party, but sending service response state information;

the virtual calling party receiving the service response state information.

In the above scheme, the service request information is sent in a mode of a short message;

the virtual called party matching the characteristic field with the data in the preset calling-called role exchange rule base of the virtual called party specifically comprises: matching a terminal number of the virtual calling party, a service request type and an optional password extracted from contents of the short message with the data in the preset calling-called role exchange rule base of the virtual called party; and judging whether a timestamp extracted from the contents of the short message is within a preset valid time.

In the above scheme, the service request information is sent in a mode of a voice call, video call or data communication;

the virtual called party matching the characteristic field with the data in the preset calling-called role exchange rule base of the virtual called party specifically comprises: matching the terminal number of the virtual calling party extracted from the service request information sent in the mode of the voice call, video call or data communication with the data in the preset calling-called role exchange rule base of the virtual called party.

In the above scheme, before matching the characteristic field carried in the service request information with the data in the preset calling-called role exchange rule base of the virtual called party, the method further comprises: judging whether the characteristic field carried in the service request information can be extracted, and if yes, considering that the service request information is valid service request information, and performing the matching.

In the above scheme, the service response state information is a service delay short message, and the method further comprises:

after sending the service delay short message, the virtual called party making a delay identifier for the short message of the service request information according to a delay count value the short message of the service request information which has been made the delay identifier, starting a timer for delay processing simultaneously, and after the timer times out, triggering a reprocessing process for the short message of the service request information which has been made the delay identifier;

the virtual calling party receiving the service delay short message, extracting the delay count value in the service delay short message, modifying a count value of a preset timeout counter, and continuing to wait for a service callback.

The present invention further provides a system for exchanging calling and called roles of communication terminals, which comprises: a virtual calling party and a virtual called party; wherein, the virtual calling party is configured to: initiate a service request, send service request information to the virtual called party, and receive a corresponding callback service initiated by the virtual called party;

the virtual called party is configured to: receive the service request information sent by the virtual calling party, match a characteristic field carried in the received service request information with data in a preset calling-called role exchange rule base of the virtual called party, and after determining that the characteristic field and data can be matched successfully, initiate a corresponding callback service to the virtual calling party according to contents of the matched items.

In the above scheme, the virtual called party is further configured to: send service response state information to the virtual calling party;

the virtual calling party is further configured to: receive the service response state information sent by the virtual called party.

In the above scheme, the service response state information is a service delay short message;

the virtual calling party is further configured to: after receiving the service delay short message sent by the virtual called party, extract a delay count value in the service delay short message, modify a count value of a preset timeout counter, and continue to wait for a service callback;

the virtual called party is further configured to: after sending the service delay short message to the virtual calling party, make a delay identifier for the short message of the service request information according to the delay count value, save the short message of the service request information which has been made the delay identifier, start a timer for delay processing simultaneously, and after the timer times out, trigger a reprocessing process for the short message of the service request information which has been made the delay identifier.

In the above scheme, the virtual calling party further comprises:

a sending module, configured to: initiate the service request, and send the service request information to the virtual called party;

a first receiving module, configured to: receive the corresponding callback service initiated by the virtual called party, and/or receive the service response state information sent by the virtual called party;

the virtual called party further comprises:

a second receiving module, configured to: receive the service request information sent by the virtual calling party, and trigger a matching module after receiving the service request information;

the matching module, configured to: match the characteristic field carried in the received service request information with the data in the preset calling-called role exchange rule base of the virtual called party, and after determining that the characteristic field and data can be matched successfully, trigger a processing module; and the processing module, configured to: after the matching module determines that the characteristic field and data can be matched successfully, initiate the corresponding callback service to the virtual calling party according to contents of matched items; and/or send the service response state information to the virtual calling party.

In the method and system for exchanging the calling and called roles of the communication terminal provided by the present invention, a communication terminal of the other party matches the characteristic field carried in the received service request information sent by a communication terminal of one party with the data in the self preset calling-called role exchange rule base, and after determining that the characteristic field and data can be matched successfully, initiates the corresponding callback service to the communication terminal of one party according to the contents of the matched items, hence, the exchange of the calling and called roles between communication terminals of the two parties can be implemented automatically. In addition, the communication terminal of one party also can receive the service response state information sent by the communication terminal of the other party, hence, the communication terminal of one party can be informed of processing condition of the request service and is not necessary to wait for the service callback of the communication terminal of the other party, thereby enhancing the user experience of communication terminal products.

PREFERRED EMBODIMENTS OF THE PRESENT INVENTION

The present invention will be further described in detail in combination with the accompanying drawings and specific examples below.

In the description of the following scheme, a communication terminal initiating communications firstly and acting a called role ultimately is referred to as a virtual calling party, and a communication terminal executing a calling function actually is referred to as a virtual called party.

Figure 1:
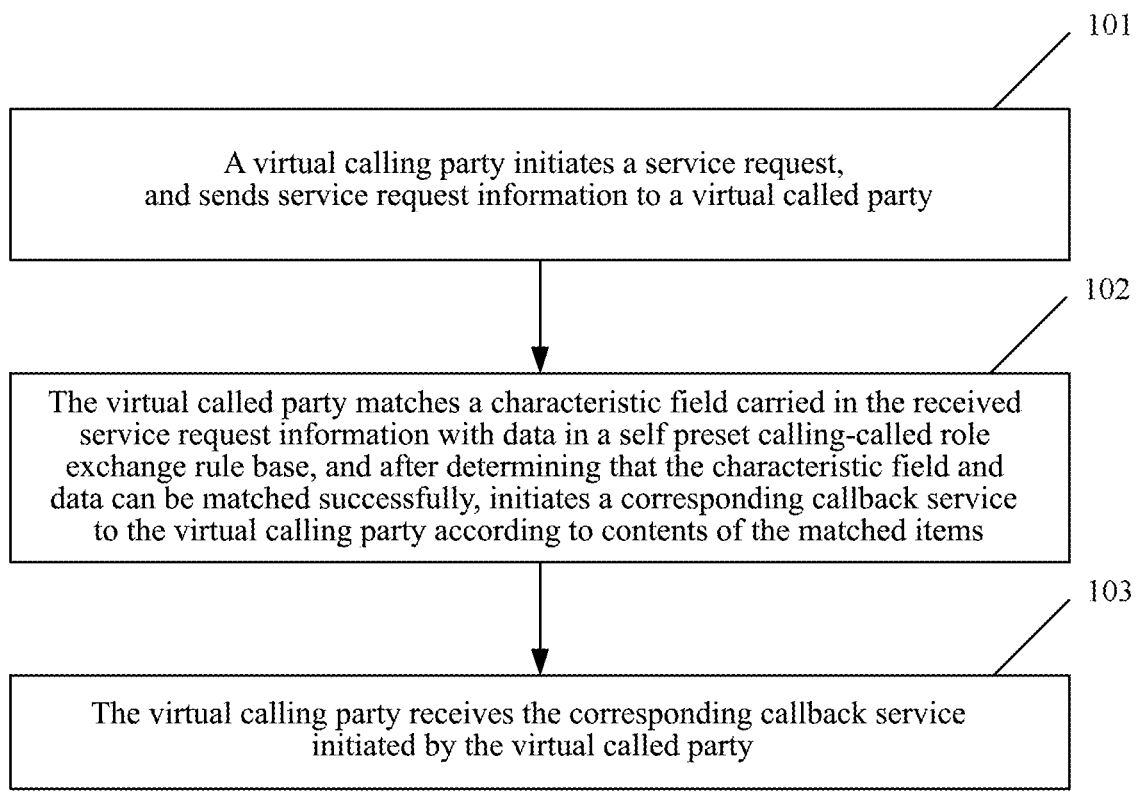
FIG. 1 is a flow diagram of implementing the method for exchanging calling and called roles of communication terminals according to the present invention.

The method for implementing the exchange of calling and called roles of communication terminals according to the present invention is as shown in FIG. 1, and following steps are included.

In step 101, a virtual calling party initiates a service request, and sends service request information to a virtual called party.

Here, if the virtual called party supports a calling-called role exchange rule controlled based on a Short Messaging Service (SMS), the virtual calling party generates a short message content containing a specific format of a characteristic field and sends the short message content to the opposite party according to a service type required to be initiated and the terminal number of the opposite party, and the short message content is included in service request information; if the virtual called party supports calling-called role exchange rules based on other services, such as the calling-called role exchange rules of voice call, video call and data communication and so on, the virtual calling party can send the service request information to the virtual called party by using other service modes until the opposite party terminates the request service. Specifically, if it is the voice call or video call, number of ring, by which the virtual called party judges whether it is the service request information, can be set; and if it is the data communication, the processing mode is identical with a short message mode. Terminating the request service can be implemented through the short message mode or a direct hangup mode.

The virtual called party can learn what kind of service that the calling-called role exchange rule supported by the virtual calling party is based on through other triodes in advance, and the other modes can be short message, or voice call and so on.

The virtual calling party waits for a callback service of the opposite party after sending the service request information to the virtual called party.

In step 102, the virtual called party matches the characteristic field carried in the received service request information with data in a self preset calling-called role exchange rule base, and after determining that the characteristic field and data can be matched successfully, initiates a corresponding callback service to the virtual calling party according to contents of the matched items.

Here, if the service request information is sent in the short message mode, the extracted characteristic field includes: a terminal number of the virtual calling party and a service request type, and can further include an optional password and/or a timestamp, and the virtual called party determines which mode is used to perform a service callback through the service request type, such as voice call, or video call and so on; and if the service request information is sent in other modes, the extracted characteristic field includes at least: the terminal number of the virtual calling party.

The matching with the data in the self preset calling-called role exchange rule base is specifically: if the service request information is sent in the short message mode, matching the extracted terminal number of the virtual calling party, service request type and optional password with the data in the self preset calling-called role exchange rule base, and further judging whether the extracted timestamp is within a preset valid time; and if the service request information is sent in the other modes, matching the extracted terminal number of the virtual calling party with the data in the self preset calling-called role exchange rule base;

after they are matched, the virtual called party also can be unnecessary to initiate the callback service promptly, but send service response state information to the virtual calling party; the service response state information can be a service rejection message, or also can be a service delay message; and the sending mode can be short message, or also can be based on other triodes such as voice call, video call and data communication and so on. Specifically, if it is the voice call or video call, number of ring can be set, and the virtual calling party judges whether it is the service rejection message through the number of ring; and if it is the data communication, the processing mode is identical with the short message mode;

if they can not be matched, a common service processing is followed. The common service processing refers to the existing service processing methods in the existing communication terminal. For example, if what is received by the virtual called party is the short message, a short message module performs processing according to a common short message, and if what are received are messages of the other services, such as voice call, video call and data communication and so on, the corresponding module performs processing.

In step 103, the virtual calling party receives the corresponding callback service initiated by the virtual called party.

Here, if the virtual called party sends the service response state information, the virtual calling party receives the service response state information; the virtual calling party extracts the terminal number of the terminal sending the service response state information to match with the self preset terminal number, and if the two can be matched, it can be known that what is received is the service response state information sent by the virtual called party.

If the virtual calling party receives the callback service initiated by the virtual called party, it is indicated that the service processing for exchanging the calling and called roles of this time is finished; the virtual calling party extracts the terminal number of the initiated callback service to match with the self preset terminal number, and if the two can be matched, it can be known that what is received is the callback service sent by the virtual called party.

Figure 2:
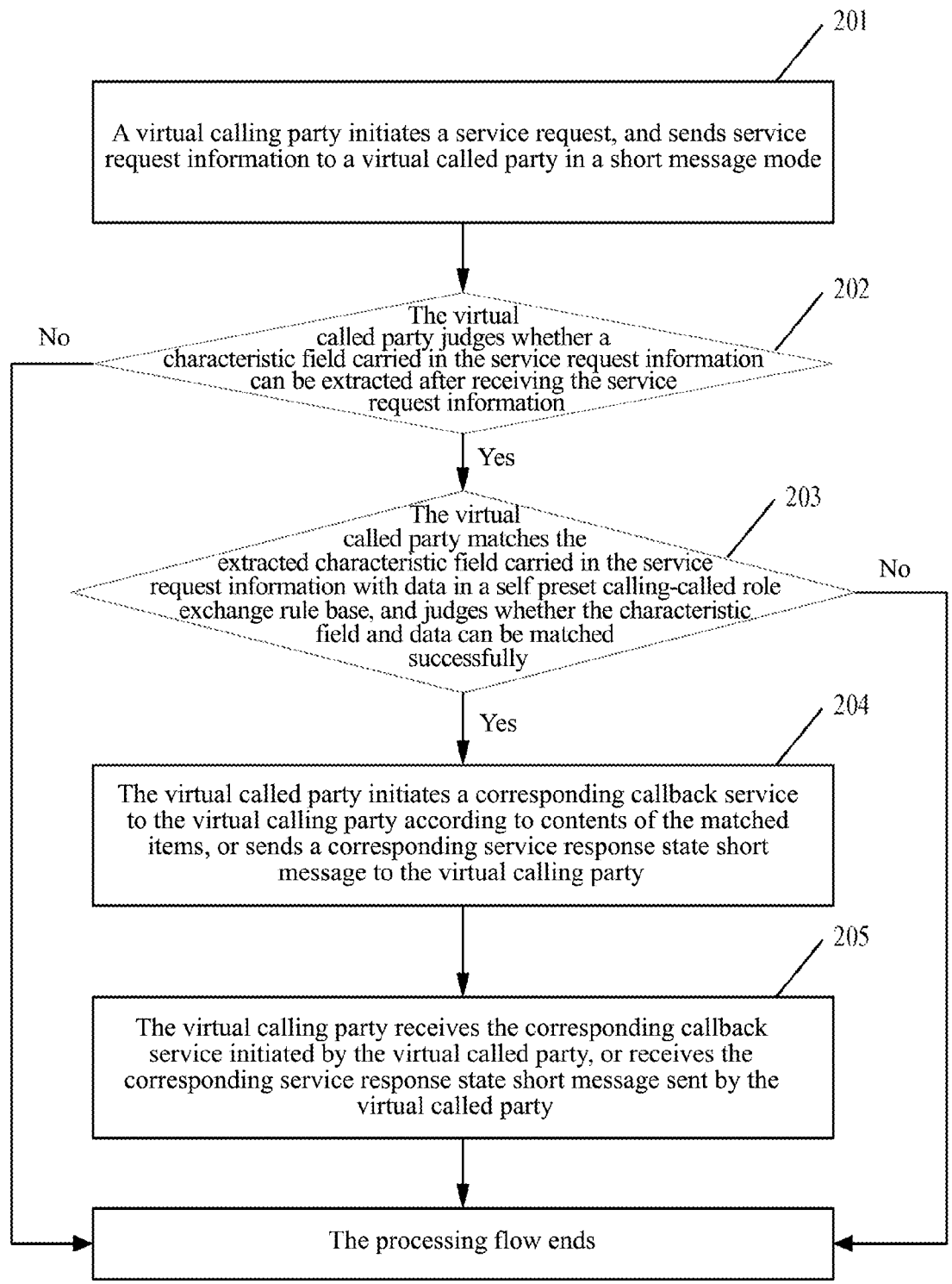
FIG. 2 is a flow diagram of method for a calling-called role exchange rule controlled based on a short messaging service.

The present invention will be further described in detail in combination with the two parties of the communication terminal supporting the calling-called role exchange rule based on the SMS control, the implementation method is as shown in FIG. 2, and following steps are included.

In step 201, a virtual calling party initiates a service request, and sends service request information to a virtual called party in a short message mode.

Here, the virtual calling party will generate a short message with an identifier after initiating the service request, contents of the short message include: a service request id (req id), a service request type, a timeout count value and an optional password; the virtual called party can acquire that it is the service request information through the identifier of the short message, and acquire that how many times the service have been requested for by the virtual calling party through the req id, and further verify the validity of identity of the virtual calling party through the optional password.

The short message is included in the service request information.

The virtual calling party waits for a feedback signal of the opposite party after sending the service request information to the virtual called party; the virtual calling party can judge whether the waiting times out according to a count value of a preset timeout counter, and after the waiting times out, prompt the user that the service request fails, and does not need to continue to wait. The processing process ends.

For example, the virtual calling party with the terminal number of 123456 initiates the service request, and sends the short message service request information with the following contents such as the req id, service request type, timeout count value and optional password to the virtual called party.

In step 202, the virtual called party judges whether a characteristic field carried in the service request information can be extracted after receiving the service request information, if yes, it is considered that the service request information is valid service request information, and step 203 is executed; and if no, it is considered that the service request information is invalid service request information, the common service processing is followed, and the processing flow ends.

Here, the characteristic field carried in the service request information includes: terminal numbers of the virtual calling party, a service request type, an optional password and a timestamp. With regard to the above example, the characteristic field carried in the service request information includes:

the terminal number 123456 of the virtual calling party, service request type, optional password and timestamp.

In step 203, the virtual called party matches the extracted characteristic field carried in the service request information with data in a self preset calling-called role exchange rule base, and judges whether the characteristic field and data can be matched successfully, if the characteristic field and data can be matched successfully, step 204 is executed, and if the characteristic field and data can not be matched successfully, the common service processing is followed, and the processing flow ends.

Here, the data in the self preset calling-called role exchange rule base preset by the virtual called party include: a terminal number of the virtual calling party, a service request type, an optional password and valid time.

Performing matching with the data in the self preset calling-called role exchange rule base is specifically: matching the extracted terminal number of the virtual calling party, service request type and optional password with the data in the self preset calling-called role exchange rule base, and judging whether the extracted timestamp is within the preset valid time. With regard to the above example, it is specifically: matching the extracted terminal number 123456 of the virtual calling party, service request type and optional password with the data in the self preset calling-called role exchange rule base, and judging whether the extracted timestamp is within the preset valid time.

The virtual calling party and virtual called party can appoint that the two parties have the unified service request type and optional password through other modes in advance, and then the virtual called party configures the calling-called role exchange rule base accordingly. The other modes can be: short message or voice call and so on.

In step 204, the virtual called party initiates a corresponding callback service to the virtual calling party according to contents of the matched items, or sends a corresponding service response state short message to the virtual calling party.

Here, the corresponding service response state short message can be a service rejection short message, or also can be a service delay short message.

It can be configured that the virtual called party will not initiate the corresponding callback service until the communication terminal obtains a callback confirmation of the users. Similarly, it can be configured that the virtual called party will not send the service delay short message or service rejection short message until the communication terminal obtains a delay confirmation or rejection confirmation from the users. After sending the service delay short message, the virtual called party will make a delay identifier for the short message of the service request information according to a delay count value in the service delay short message, save the short message of the service request information which has been made the delay identifier, start a timer for delay processing simultaneously, wherein the duration of the timer is related to the delay count value, and after the timer times out, trigger a reprocessing process on the short message of the service request information which has been made the delay identifier, and the reprocessing process is identical with the above flow of the method.

With regard to the above example, after they can be matched successfully, according to the terminal number 123456 of the virtual calling party contained in the short message service request information, the virtual called party can directly initiate the corresponding callback service to the virtual calling party, and also can initiate the callback service after interacting other information with the virtual calling party. For example, the virtual called party firstly sends one short message for needing to confirm a callback service to the virtual calling party, and after receiving information of confirming the callback service from the virtual calling party, initiates the corresponding callback service. In addition, before initiating the callback service, the virtual called party also can send a prompt, whether the callback should be performed, to the users of the communication terminal, and after receiving the confirmation from the users, initiate the corresponding callback service to the virtual calling party.

In step 205, the virtual calling party receives the corresponding callback service initiated by the virtual called party, or receives the corresponding service response state short message sent by the virtual called party, and the processing flow ends.

Here, if the virtual calling party receives the corresponding callback service initiate by the virtual called party, it is indicated that the current service processing for exchanging the calling and called roles is completed; if the virtual calling party receives the service rejection short message, it is indicated that the current service processing for exchanging the calling and called roles is failed; and if the virtual calling party receives the service delay short message, the virtual calling party extracts the delay count value in the service delay short message, and then modifies the preset count value of the timeout counter, and continues to wait for the service callback.

The virtual calling party extracts the terminal number of the initiated callback service to match with the self preset terminal number, and if the two can be matched successfully, it can be known that the received corresponding callback service is initiated by the virtual called party. The service response state information includes: a terminal number of the terminal sending the service response state information and a req id, the virtual calling party extracts the terminal number of the terminal sending the service response state information and req id to match with the self preset terminal number and req id, and if they can be matched successfully, it can be known that the received service response state information is sent by the virtual called party.

After the current service processing is finished, the virtual called party can make certain counting statistics, such as conversation time and times of delay and so on, and also can update the data in the calling-called role exchange rule base according to the made counting statistics, such as deleting certain terminal numbers and so on.

Figure 3:
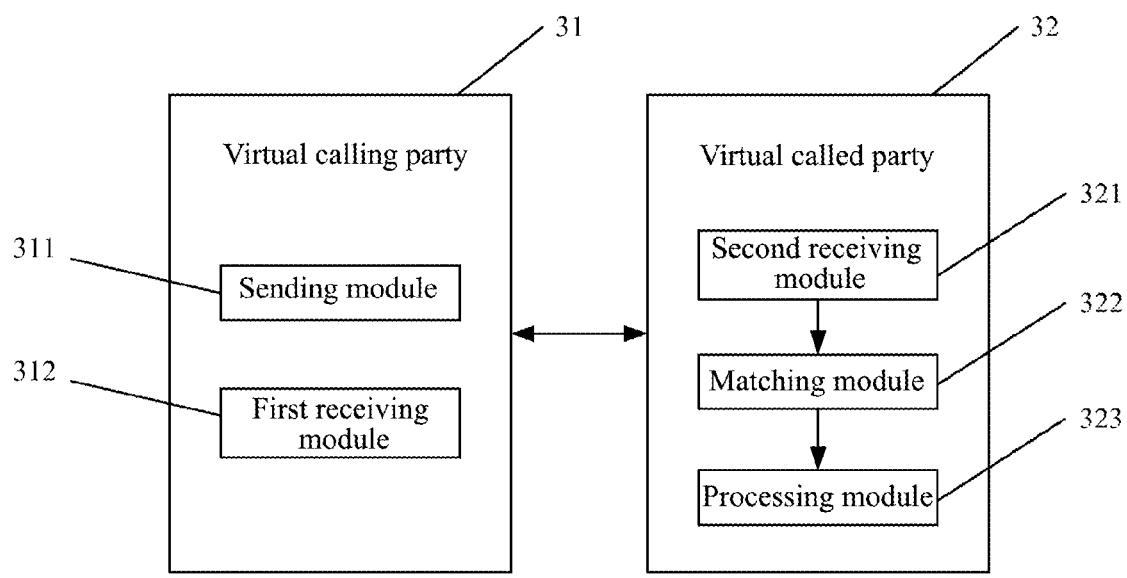
FIG. 3 is a structure diagram of the system for exchanging calling and called roles of communication terminals according to the present invention.

Based on the above method and as shown in FIG. 3, the present invention also provides a system for exchanging calling and called roles of communication terminals, and the system includes: a virtual calling party 31 and a virtual called party 32; wherein, the virtual calling party 31 is configured to: initiate a service request, send service request information to the virtual called party 32, and receive a corresponding callback service initiated by the virtual called party 32;

the virtual called party 32 is configured to: receive the service request information sent by the virtual calling party 31, match a characteristic field carried in the received service request information with data in a self preset calling-called role exchange rule base, and after determining that the characteristic field and data can be matched successfully, initiate the corresponding callback service to the virtual calling party 31 according to contents of the matched items.

Wherein, the virtual called party 32 is further configured to: send service response state information to the virtual calling party 31;

the virtual calling party 31 is further configured to: receive the service response state information sent by the virtual called party 32.

The virtual called party 32 is further configured to: after determining that the characteristic field carried in the received service request information on can not be matched with the data in the self preset calling-called role exchange rule base, process the service request initiated by the virtual calling party 31 as a common service.

The virtual calling party 31 is further configured to: after receiving a service delay short message sent by the virtual called party 32, extract a delay count value in the service delay short message, and then modify a preset count value of a timeout counter, and continue to wait for the service callback;

the virtual called party 32 is further configured to: after sending the service delay short message to the virtual calling party 31, make a delay identifier for the short message of the service request information according to the delay count value, save the short message of the service request information which has been made the delay identifier, start a triggering timer for delay processing simultaneously, and after the timer times out, trigger a reprocessing process for the short message of the service request information which has been made the delay identifier; and the virtual called party 32 can be further configured to: after the service processing is finished, make counting statistics, and update the data in the self preset calling-called role exchange rule base according to the made counting statistics.

Wherein, the virtual calling party 31 can further comprise:

a sending module 311, configured to; initiate the service request, and send the service request information to the virtual called party 32;

a first receiving module 312, configured to: receive the corresponding callback service initiated by the virtual called party 32;

the virtual called party 32 can further comprise:

a second receiving module 321, configured to: receive the service request information sent by the virtual calling party 31, and trigger a matching module 322 after receiving the service request information;

the matching module 322, configured to: match the characteristic field carried in the received service request information with the data in the self preset calling-called role exchange rule base, and after determining that the characteristic field and data can be matched successfully, trigger a processing module 323; and the processing module 323, configured to: after the matching module 322 determines that the characteristic field and data can be matched successfully, initiate the corresponding callback service to the virtual calling party 31 according to the contents of the matched items.

The first receiving nodule 311 is further configured to: receive the service response state information sent by the virtual called party 32;

the processing module 323 is further configured to: send the service response state information to the virtual calling party 31.

The virtual calling party 31 can further comprise:

a modifying module, configured to: after the first receiving module 311 receives the service delay short message, extract the delay count value in the service delay short message, and then modify the count value of the preset timeout counter, and continue to wait for the service callback;

the processing module 323 is further configured to: after sending the service delay short message to the virtual calling party 31, make the delay identifier for the short message of the service request information according to the delay count value, save the short message of the service request information which has been made the delay identifier, start the triggering timer for delay processing simultaneously, and after the timer times out, trigger the reprocessing process for the short message of the service request information which has been made the delay identifier.

The virtual calling party 31 can further comprise:

a counting module, configured to: make the counting statistics after the service processing is finished.

The above description is only the preferred examples of the present invention, which is not used to limit the protection scope of the present invention. All the modifications, equivalent substitutions, and improvements, etc. made within the spirit and principle of the present invention shall fall into the protection scope of the present invention.

What is claimed is:

1. A method for exchanging calling and called roles of communication terminals, comprising:
    a virtual calling party initiating a service request, and sending service request information to a virtual called party;
    the virtual called party matching a characteristic field carried in the received service request information with data in a preset calling-called role exchange rule base of the virtual called party, and after determining that the characteristic field and the data can be matched successfully, initiating a corresponding callback service to the virtual calling party according to contents of matched items; and the virtual calling party receiving the corresponding callback service initiated by the virtual called party;
    wherein, after determining that the characteristic field and data can be matched successfully, the method further comprises:
        the virtual called party not initiating the callback service to the virtual calling party, but sending service response state information;
        the virtual calling party receiving the service response state information;
    wherein, the service response state information is a service delay short message, and the method further comprises:
        after sending the service delay short message, the virtual called party making a delay identifier for the short message of the service request information according to a delay count value, saving the short message of the service request information which has been made the delay identifier, starting a timer for delay processing simultaneously, and after the timer times out, triggering a reprocessing process for the short message of the service request information which has been made the delay identifier;
        the virtual calling party receiving the service delay short message, extracting the delay count value in the service delay short message, modifying a count value of a preset timeout counter, and continuing to wait for a service callback.

2. The method according to claim 1, wherein, the service request information is sent in a mode of a short message;
    the virtual called party matching the characteristic field with the data in the preset calling-called role exchange rule base of the virtual called party specifically comprises: matching a terminal number of the virtual calling party, a service request type and an optional password extracted from contents of the short message with the data in the preset calling-called role exchange rule base of the virtual called party; and judging whether a timestamp extracted from the contents of the short message is within a preset valid time.

3. The method according to claim 1, wherein, the service request information is sent in a mode of a voice call, video call or data communication;

the virtual called party matching the characteristic field with the data in the preset calling-called role exchange rule base of the virtual called party specifically comprises: matching the terminal number of the virtual calling party extracted from the service request information sent in the mode of the voice call, video call or data communication with the data in the preset calling-called role exchange rule base of the virtual called party.

4. The method according to claim 1, wherein, before matching the characteristic field carried in the service request information with the data in the preset calling-called role exchange rule base of the virtual called party, the method further comprises: judging whether the characteristic field carried in the service request information can be extracted, and if yes, considering that the service request information is valid service request information, and performing the matching.

5. A system for exchanging calling and called roles of communication terminals, comprising: a virtual calling party and a virtual called party; wherein, the virtual calling party is configured to: initiate a service request, send service request information to the virtual called party, and receive a corresponding callback service initiated by the virtual called party;

the virtual called party is configured to: receive the service request information sent by the virtual calling party, match a characteristic field carried in the received service request information with data in a preset calling-called role exchange rule base of the virtual called party, and after determining that the characteristic field and data can be matched successfully, initiate a corresponding callback service to the virtual calling party according to contents of the matched items;

wherein, the virtual called party is further configured to: send service response state information to the virtual calling party;

the virtual calling party is further configured to: receive the service response state information sent by the virtual called party;

wherein, the service response state information is a service delay short message;

the virtual calling party is further configured to: after receiving the service delay short message sent by the virtual called party, extract a delay count value in the service delay short message, modify a count value of a preset timeout counter, and continue to wait for a service callback;

the virtual called party is further configured to: after sending the service delay short message to the virtual calling party, make a delay identifier for the short message of the service request information according to the delay count value, save the short message of the service request information which has been made the delay identifier, start a timer for delay processing simultaneously, and after the timer times out, trigger a reprocessing process for the short message of the service request information which has been made the delay identifier.

6. The system according to claim 5, wherein, the virtual calling party further comprises:

a sending module, configured to: initiate the service request, and send the service request information to the virtual called party;

a first receiving module, configured to: receive the corresponding callback service initiated by the virtual called party, and/or receive the service response state information sent by the virtual called party;

the virtual called party further comprises:

a second receiving module, configured to: receive the service request information sent by the virtual calling party, and trigger a matching module after receiving the service request information;

the matching module, configured to: match the characteristic field carried in the received service request information with the data in the preset calling-called role exchange rule base of the virtual called party, and after determining that the characteristic field and data can be matched successfully, trigger a processing module; and the processing module, configured to: after the matching module determines that the characteristic field and data can be matched successfully, initiate the corresponding callback service to the virtual calling party according to contents of matched items; and/or send the service response state information to the virtual calling party.

\* \* \* \* \*